United States Patent [19]

Merkel

[11] Patent Number: 5,323,005
[45] Date of Patent: Jun. 21, 1994

[54] METHOD AND APPARATUS FOR MONITORING ENERGY RADIANT FROM A DISPENSED HEATED MATERIAL

[75] Inventor: Stephen L. Merkel, Bay Village, Ohio

[73] Assignee: Nordson Corporation, Westlake, Ohio

[21] Appl. No.: 61,141

[22] Filed: May 12, 1993

[51] Int. Cl.⁵ .............................. G01J 5/26; G01J 5/02
[52] U.S. Cl. .................................. 250/338.1; 250/340; 250/353; 374/121; 374/125; 374/131; 374/132
[58] Field of Search ........................ 250/338.1, 340, 342, 250/352, 359.1, 353; 359/509; 374/120, 121, 125, 130, 131, 132

[56] References Cited

U.S. PATENT DOCUMENTS

| | | |
|---|---|---|
| 4,260,258 | 4/1981 | Rose et al. |
| 4,495,416 | 1/1985 | Mason et al. ............... 250/342 X |
| 4,566,808 | 1/1986 | Pompei et al. |
| 4,636,091 | 1/1987 | Pompei et al. ............... 250/342 X |
| 4,831,258 | 5/1989 | Paulk et al. ............... 250/338.1 X |
| 5,026,989 | 6/1991 | Merkel. |
| 5,172,978 | 12/1992 | Nomura et al. ............... 374/130 |

FOREIGN PATENT DOCUMENTS 63-145929  6/1988  Japan ................... 374/121

OTHER PUBLICATIONS

ELTEC Instruments, Inc. 815/815B IR-EYE ™ Sensing/Monitor (Publication) 1984 (11 pages).

Primary Examiner—Constantine Hannaher
Assistant Examiner—Edward J. Glick
Attorney, Agent, or Firm—Raymond J. Slattery, III

[57] ABSTRACT

The monitoring of energy radiating from a heated material, such as a hot melt adhesive, dispensed onto a substrate may be accomplished by an infrared sensor. The wand of the infrared sensor is located downstream of the dispensed material for receiving the radiant energy. The wand is provided with internal air for cooling and for providing laminar air flow in the vicinity of the lens to prevent the accumulation of airborne contaminants on the lens. The wand is also provided with a light aiming device.

17 Claims, 2 Drawing Sheets

FIG.—1

METHOD AND APPARATUS FOR MONITORING ENERGY RADIANT FROM A DISPENSED HEATED MATERIAL

BACKGROUND OF THE INVENTION

This invention relates generally to sensors for monitoring the dispensing of material onto a substrate, and more particularly concerns an infrared sensor for monitoring energy radiating from a material dispensed onto a substrate.

In applying coating materials such as paints and adhesives to substrates, it is often important to monitor the material to ensure that it has been suitably applied. Applied materials can be monitored visually, or through the use of various types of sensors.

In some applications sensors are employed which monitor energy radiant from the material applied to the substrate. For example, in the case of dispensing a heated adhesive bead onto a substrate, an infrared sensor can be employed to monitor the applied adhesive. Such an infrared sensor typically exhibits a resistance which is dependent upon the intensity of received infrared radiation that is within a certain energy band. The sensor is usually connected to circuitry, in which resistance changes, in the sensor, are converted to voltage variations, which are in turn amplified to provide an output signal indicative of the level of infrared radiation from the adhesive bead. This infrared radiation level is a composite indication of the size of the adhesive bead and its temperature.

In the case of a continuously applied bead of heated adhesive, the sensor can be positioned near the adhesive dispenser, slightly downstream therefrom, and the electrical output signal of the associated circuit monitored to assure that the infrared radiation from the adhesive bead falls within an acceptable range.

Typically, the dispenser and its associated hoses are heated in order to maintain the adhesive at its appropriate application temperature. For a packaging grade adhesive, the application temperature is typically between 250° F. and about 400° F. The elevated temperature of the dispensed adhesive and/or the body of the dispenser increases the surrounding ambient temperature. This in turn may raise the temperature of the sensor to a point where its monitoring characteristics are reduced or completely impeded so as to prevent accurate monitoring of the received infrared radiation as an adhesive bead passes the sensor.

Another difficulty that arises from the environment in which the sensor must operate results from adhesive coating the lens of the sensor. As the dispensing of the bead of adhesive is terminated, adhesive filaments may form and become airborne. These filaments may attach themselves to the lens of the sensor, thus obstructing its view. Also, during dispensing an irregularity in the nozzle, such as caused by a partial clog, may cause the bead of adhesive to deviate from its intended path and coat the sensor.

Still another difficulty in detecting dispensed beads of materials arises in assuring that the sensor is aimed at the intended bead of material to be sensed. This is important due to the limited field of view of the sensor and its sensitivity of the sensor. For example, if multiple beads of adhesive have been deposited on the substrate, it may be important to assure that the proper bead is being sensed.

SUMMARY OF THE INVENTION

It therefore is an object of this invention to provide a sensor which is more readily suitable for use in the environment associated with sensing dispensed heated materials, such as, for example, adhesives, sealants, caulks, etc.

It is another object of the invention to provide a sensor which is readily aimable.

These and other objects, features, and advantages can be accomplished by an apparatus for monitoring energy radiant from a heated material, dispensed onto a substrate comprising a body defining a bore having a first and a second end; a sensor mount, disposed within the bore at the first end of the body and forming a cavity between an outer surface of the sensor mount and an inner surface of the bore, the sensor mount defining a bore therethrough communicating with the bore of the body and having an air passageway communicating directly to the cavity; a lens; a retaining ring, disposed within the body for maintaining the lens in contact with the sensor mount, and having a plurality of openings therein, the openings communicating with the cavity; a sensor carried by the sensor mount; and a connector means, operatively coupled to the second end of the body, for electrically coupling the sensor to external circuitry and for couplinq the bore of the body to a supply of air pressure; wherein the passage of air from the body, through the retaining ring provides cooling to the sensor while also reducing the accumulation of airborne contaminants onto the lens.

The above may be further accomplished by the method of monitoring energy radiant from a heated material dispensed from a heated dispenser onto a substrate comprising of the steps of: providing a detector wand, positioned downstream from the dispenser and spaced apart from the material to be dispensed onto the substrate; aiming the detector wand by energizing a source of visible light, the visible light passing through a lens of the wand, and impinging either the material to be detected or an area of the substrate in which the material will be deposited; providing air to the interior of the detector wand to provide cooling to electrical components therein, while also causing the air to escape in the vicinity of the lens to produce substantially laminar airflow therefrom, such that the accumulation of airborne contaminants upon the lens is reduced; directing radiant energy from the dispersed material through the lens to the sensor wherein the radiant energy and the visible light travel along substantially the same path between the wand and the substrate; and generating signals in response to the energy received by the sensor.

BRIEF DESCRIPTION OF THE DRAWINGS

The following is a brief description of the drawings in which like parts may bear like reference numerals and in which.

DESCRIPTION OF THE INVENTION

Figure 1:
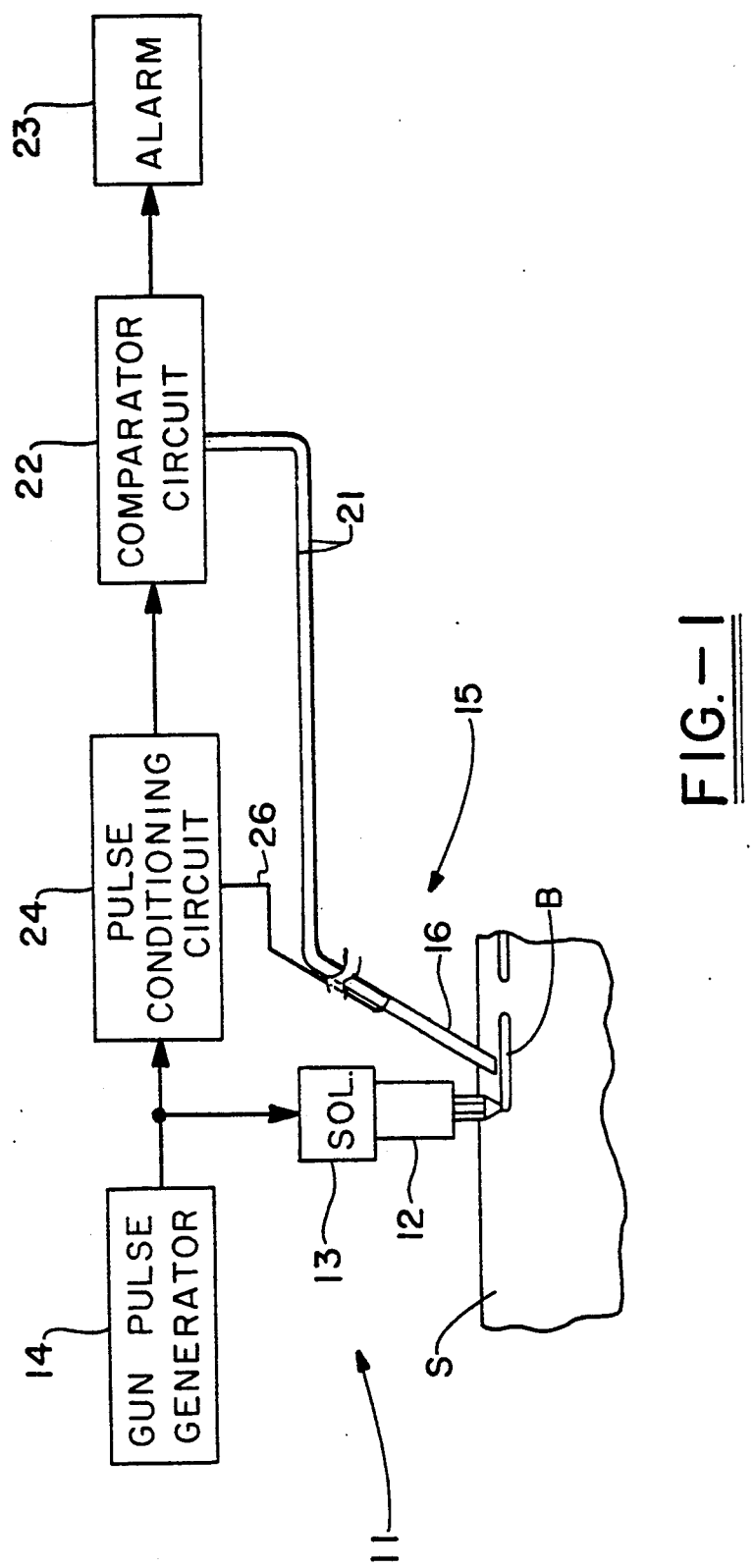
FIG. 1 is a diagrammatic illustration of an adhesive bead dispensing arrangement including a monitoring system in accordance with the present invention.
Figure 2:
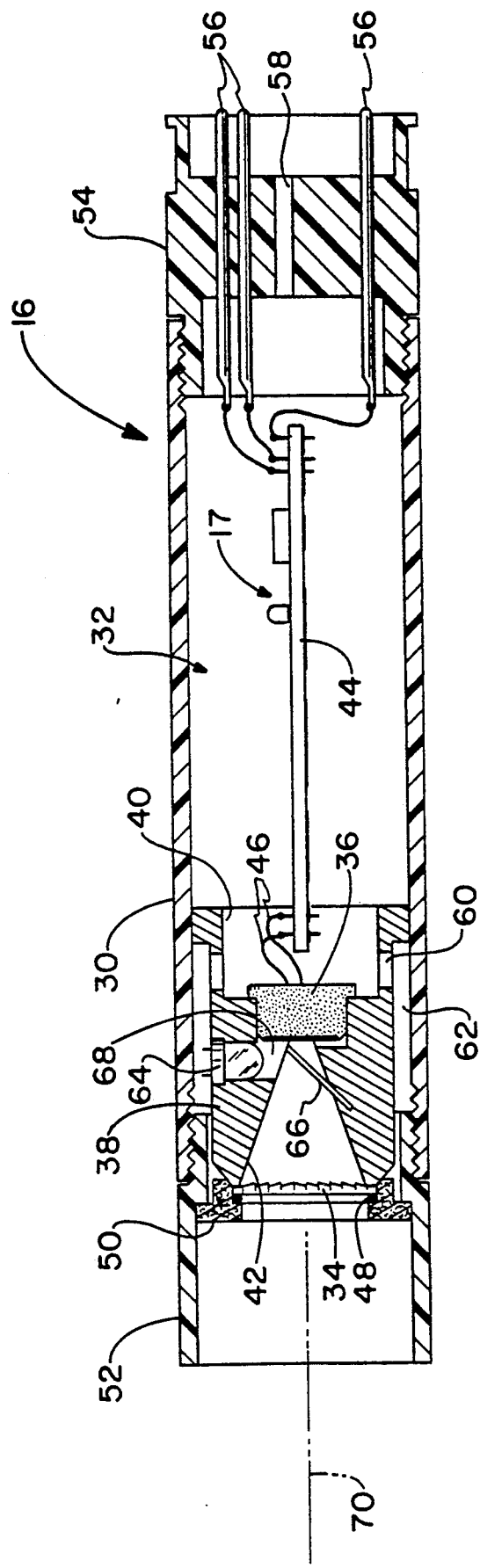
FIG. 2 is a cross sectional view of the adhesive wand.

Referring now to the drawings, a heated adhesive dispenser arrangement 11 includes a dispenser 12 for dispensing a heated adhesive, such as a heated weldable sealant or a packaging adhesive. The dispenser 12 includes a valve (not shown) which may be controlled, for example, by a solenoid 13 to dispense adhesive onto a substrate S. Adhesive is dispensed through a nozzle when the valve is open and prevented from flowing when the valve is closed. A generator 14 produces signals which are coupled to the solenoid 13 to open the valve so that adhesive is dispensed.

The dispensed adhesive is sensed by an infrared detector, shown generally as reference numeral 15. The detector 15 includes an adhesive bead detector wand 16 which is positioned slightly downstream from the dispenser 12 and spaced apart from the beads of adhesive B which have been dispensed onto the substrate S. The bead detector wand circuitry 17 may be coupled by suitable electrical lines 21 and 26 to other electrical circuitry, such as set forth in U.S. Pat. No. 5,026,989, the disclosure thereof is hereby incorporated herein in its entirety.

The adhesive detector wand 16 further includes a tubular body 30 defining a cavity 32. The wand 16 includes in its end adjacent to the beads B a flat Fresnel lens 34 which directs infrared radiation from the adhesive beads B to an infrared sensor 36. The infrared sensor 36 may be, for example, a lead selenide sensor sensitive to infrared radiation having wave lengths in the range between 1 and 4 micrometers. In its band of sensitivity, the resistance of the sensor 24 decreases as the level of radiation increases.

Disposed within the tubular body 30 is a sensor mount 38 having a through bore therein. The through bore comprises a first portion which is step bore 40 coupled to a second portion having a substantially triangular cross-section 42. The sensor 36 is mounted within the step bore 40 of a sensor mount 38. The bead detector wand circuitry 17 includes a circuit board 44 which is attached to the sensor mount 38. The sensor 36 is coupled to the circuit board 44 by electrical lines 46.

The conical bore 42 of the sensor mount 38 is located adjacent to the end of a tubular body adjacent to the beads to be sensed and has the flat Fresnel lens 34 attached thereto. The lens 34 is held by the sensor mount 38, O-ring 48, and a retaining ring 50. The retaining ring 50 is an air diffuser which may be a porous structure comprised of finely sintered bronze pellets to produce a fine mesh.

It is preferred that the tubular body extend past the lens 34 in order to prevent the accumulation of adhesive and other airborne materials from collecting on the surface of the lens 34. As such, the body may be provided with a shroud 52 which allows the lens to be recessed therein and thus protected from airborne contaminants.

At the end of the tubular body, opposite that of the lens and sensor, is a connector 54. The connector 54 includes a number of electrical pins 56 coupled to the bead detector wand circuitry 17. The connector 54 also includes a bore 58 which communicates with the cavity 32 of the tubular body 30. The bore 58 is capable of being coupled to an air supply (not shown) such that air passes through bore 58 in the connector 54 and into the cavity 32 of detector wand 16. Air passes through slots 60 in the step bore 40 into a cavity 62 formed between the sensor mount 38 and the tubular body 30. The air then escapes from the cavity 62 through the retaining ring 50. It is preferred that the air emitting from the retaining ring results in substantially laminar air flow in the vicinity of the lens.

The air performs several functions. First, the flow of air around the bead detector wand circuitry 17 and the infrared sensor 36 provides cooling to these electrical components to reduce or minimize their associated temperature rise and thereby remain within their temperature tolerances. This cooling, therefore, allows the electrical components to operate in the heated environment associated with the dispensing of heated fluid materials, such as hot melt adhesives. Secondly, the air emitting from the air diffuser retaining ring 50 helps prevent airborne contaminants from collecting on the lens 34 of the wand 16. As such, the lens of the wand remains cleaner longer.

The detector wand 16 may also include a light emitting diode (LED) 64 and a mirror 66 mounted within the sensor mount 38. The LED is mounted within a bore 68 which is coupled to the conical bore 42. The LED 66 emits visible light which is reflected off of the mirror 66, through the lens 34, and onto the substrate S. The LED 64 is electrically coupled to circuitry (not shown) such that during aiming it may be energized to produce a spot of light on the substrate. It is preferred that the visible light of the LED 64 is reflected by the mirror 66 along the center line 70 of the infrared light received by the sensor 36. In other words, the light received by the sensor and the beam of light transmitted by the LED each travel substantially along the same path between the wand and the substrate. Therefore, by aiming the light spot on the portion of the substrate to be monitored, the detector wand will have been aimed to ensure that the maximum amount of infrared radiation emitted from that point will be received by the sensor 36 of the wand 16. Obviously, the mirror 66 must be able to reflect visible light emitted from the LED 64 while allowing infrared radiation to pass there through so that it can be received by the sensor 36. This may be accomplished by utilizing a beam splitting mirror.

These descriptions and details have been shown for the purpose of illustrating this invention and will become apparent to those skilled in the art that various changes and/or modifications may be made wherein without departing from their original spirit or scope of the invention.

It is claimed:

1. An apparatus for monitoring energy radiant from a heated material, dispensed onto a substrate comprising:
   a body defining a bore having a first and a second end;
   a sensor mount, disposed within said bore at the first end of said body and forming a cavity between an outer surface of the sensor mount and an inner surface of the bore, the sensor mount defining a bore therethrough communicating with said bore of said body and having an air passageway communicating directly to said cavity;
   a lens;
   a retaining ring, disposed within the body for maintaining the lens in contact with the sensor mount, and having a plurality of openings therein, the openings communicating with the cavity;
   a sensor carried by the sensor mount;
   a connector means, operatively coupled to the second end of said body, for electrically coupling the sensor to external circuitry and for coupling the bore of the body to a supply of air pressure;
   a means for supplying visible light;
   a beam splitting means carried within the body for allowing the energy radiating from the dispensed material to be received by the sensor while also allowing the visible light to be transmitted through the lens to the substrate; and wherein the passage of air from the body, through the retaining ring provides cooling to the sensor while also reducing the accumulation of airborne contaminants onto the lens.

2. The apparatus of claim 1 further comprising an electrical circuit means, disposed within the body for receiving signals from the sensor.

3. The apparatus of claim 1 wherein the bore of the sensor mount comprises a first and second portion and wherein said first portion is a stepped bore.

4. The apparatus of claim 3 wherein the second portion of the bore of the sensor mount is substantially triangular in cross-section.

5. The apparatus of claim 3 wherein the sensor is disposed within the stepped bore of the sensor mount.

6. The apparatus of claim 5 wherein the means for generating visible light is a light emitting diode, disposed within a bore communicating with the second portion of the bore of the sensor mount and the beam splitting means is a beam splitting mirror, disposed within the second portion of the bore of the sensor mount.

7. The apparatus of claim 1 wherein the means for generating visible light is a light emitting diode, disposed within a bore communicating with the bore of the sensor mount and the beam splitting means is a beam splitting mirror, disposed within the bore of the sensor mount.

8. The method of monitoring energy radiant from a material dispensed from a heated dispenser onto a substrate comprising of the steps of:
   providing a detector wand, positioned downstream from the dispenser and spaced apart from the material to be dispensed onto the substrate;
   aiming the detector wand by energizing a source of visible light, the visible light passing through a lens of the wand, and impinging either the material to be detected or an area of the substrate in which the material will be deposited;
   providing air to the interior of the detector wand to provide cooling to electrical components therein, while also causing the air to escape in the vicinity of the lens to produce substantially laminar airflow therefrom, such that the accumulation of airborne contaminants upon the lens is reduced;
   directing radiant energy from the dispensed material through the lens and to the sensor wherein the radiant energy and the visible light travel along substantially the same path between the wand and the substrate; and
   generating signals in response to the energy received by the sensor.

9. The method of claim 8 wherein the detector wand comprises:
   a body defining a bore having a first and a second end;
   a sensor mount, disposed within said bore at the first end of said body and forming a cavity between an outer surface of the sensor mount and an inner surface of the bore, the sensor mount defining a bore therethrough communicating with said bore of said body and having an air passageway communicating directly to said cavity;
   a lens;
   a retaining ring, disposed within the body for maintaining the lens in contact with the sensor mount, and having a plurality of openings therein, the openings communicating with the cavity;
   a sensor carried by the sensor mount; and
   a connector means, operatively coupled to the second end of said body, for electrically coupling the sensor to external circuitry and for coupling the bore of the body to a supply of air pressure.

10. The method of claim 9 further comprising:
    a means for supplying visible light; and
    a beam splitting means carried within the body for allowing the energy radiating from the dispensed material to be received by the sensor while also allowing the visible light to be transmitted through the lens to the substrate.

11. The method of claim 10 wherein the means for generating visible light is a light emitting diode, disposed within a bore communicating with the bore of the sensor mount and the beam splitting means is a beam splitting mirror, disposed within the bore of the sensor mount.

12. The method of claim 9 further comprising an electrical circuit means, disposed within the body for receiving signals from the sensor.

13. The method of claim 9 wherein the bore of the sensor mount comprises a first and second portion and wherein said first portion is a stepped bore.

14. The method of claim 13 wherein the second portion of the bore of the sensor mount is substantially triangular in cross-section.

15. The method of claim 13 wherein the sensor is disposed within the stepped bore of the sensor mount.

16. The method of claim 15 further comprising:
    a means for supplying visible light; and
    a beam splitting means carried within the body for allowing the energy radiating from the dispensed material to be received by the sensor while also allowing the visible light to be transmitted through the lens to the substrate.

17. The method of claim 16 wherein the means for generating visible light is a light emitting diode, disposed within a bore communicating with the second portion of the bore of the sensor mount and the beam splitting means is a beam splitting mirror, disposed within the second portion of the bore of the sensor mount.

* * * * *